(12) United States Patent
Manber et al.

(10) Patent No.: US 7,788,134 B1
(45) Date of Patent: Aug. 31, 2010

(54) METHOD AND SYSTEM FOR DISPLAYING ITEMS USING GEOGRAPHIC ATTRIBUTES

(75) Inventors: Udi Manber, Palo Alto, CA (US); Barnaby M Dorfman, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 1013 days.

(21) Appl. No.: 11/090,326

(22) Filed: Mar. 25, 2005

(51) Int. Cl.
*G06Q 30/00* (2006.01)

(52) U.S. Cl. .......................................... 705/26

(58) Field of Classification Search ............... 705/26, 705/27
See application file for complete search history.

(56) References Cited

U.S. PATENT DOCUMENTS

| | | | |
|---|---|---|---|
| 6,757,740 B1 | 6/2004 | Parekh et al. | |
| 2002/0087522 A1* | 7/2002 | MacGregor et al. | 707/3 |
| 2002/0143462 A1* | 10/2002 | Warren | 701/200 |
| 2003/0110293 A1 | 6/2003 | Friedman et al. | |
| 2004/0117276 A1* | 6/2004 | Kettler, III | 705/29 |
| 2005/0268254 A1 | 12/2005 | Abramson et al. | |
| 2006/0026170 A1* | 2/2006 | Kreitler et al. | 707/10 |

OTHER PUBLICATIONS

Olsen, S., "Digital Envoy Wins Geotargeting Patent," *CNET* News. Com, © 1995-2004, <http://news.com.com/2102-1032_3-5251844. html?tag=st.util.print> [retrieved Aug. 4, 2004].
"MetaCarta: Geographic Text Search Systems," Metcarta.com, © 2004, <http://www.metacarta.com/> [retrieved Sep. 23, 2004].
Cowley, S., "Google Faces A Lawsuit: Digital Envoy Accuses The Search Giant Of Abusing A Licensing Agreement," *PCWorld*, © 2004, <http://www.pcworld.com/resource/printable/article/0,aid,115463,00.asp> [retrieved Apr. 13, 2004].
Francica, J., "MetaCarta: Geographic Text Searching," *DirectionsMagazine*, © 2004, <http://www.directionsmag.com/editorials.php?article_id=531> [retrieved Sep. 24, 2004].
Olsen, S., "Google Fires Back At Digital Envoy," *CNET* News.Com, © 2004, <http://news.com.com/2100-1024_3-5200584. html?tag=nefd.top> [retrieved Apr. 26, 2004].

(Continued)

*Primary Examiner*—Mila Airapetian
(74) *Attorney, Agent, or Firm*—Townsend and Townsend and Crew LLP

(57) ABSTRACT

An item may be analyzed to identify one or more geographic attributes that are associated with the item. Items are searchable using a geographic attribute to identify geographically related items. A search of a catalog of items identifies items having a geographic attribute shared by the geographic attribute at the focus of the search. Embodiments may enable a user to obtain an identified item in a commercial transaction. A display component can be configured to provide a map on which one or more of the identified items are shown. While not intuitive to users, using geography to search and identify geographically related items in a catalog can provide users with a unique way of looking at items and conducting commercial transactions for such items. Geographic attributes of individual items may also be displayed on a map.

43 Claims, 10 Drawing Sheets

OTHER PUBLICATIONS

"Windermere: Search For Properties," *Windermere*, © 1995-2004, <http://www.windermere.com/index.cfm?fuseaction=listing.searchPropertyMapv2>.

"Windermere: Search For Properties: Home Page," *Windermere*, © 1995-2004, <http://www.winderrnere.com/index.cfm?fuseaction=about.home>.

"Google Advanced Search," Google.com, n.d., <http://www.google.com/advanced_search?hl=en> [retrieved May 4, 2004].

"Google Local Beta," Google.com, © 2004, <http://www.google.com/lochp> [retrieved May 4, 2004].

"Google Local Beta," Google.com, n.d., <<http://www.google.com/local?sc=1&q=pies&near=seattle%2C+wa&btnG=Google+search...> [retrieved May 4, 2004].

"Google Local Beta," Google.com, n.d., <http://www.google.com/local?q=pies&hl=en&lr=&ie=UTF-+8&oe=UTF-8&sa=G&near=sea...> [retrieved May 4, 2004].

"Google Local Help," Google.com, © 2004, <http://www.google.com/help/faq_local.html> [retrieved May 4, 2004].

"Google Images," Google.com, n.d., <http://www.google.com/images?as_q=seattle&svnum=10&hl=en&ie=UTF-8&oe= UTF-8&...> [retrieved May 4, 2004].

"Yahoo! Search," Yahoo.com, © 2004, <http://search.yahoo.com/> [retrieved May 4, 2004].

"Yahoo! Search: Advanced Web Search," Yahoo.com, n.d., <http://search.yahoo.com/search/options?fr=fp-top&p=> [retrieved May 4, 2004].

"Yahoo! Search," Yahoo.com, n.d., <http://images.search.yahoo.com/search/options?ei=UTF-8&fr=sfp&p=seattle> [retrieved May 4, 2004].

"Yahoo! Get Local," Yahoo.com, n.d., <http://yp.yahoo.com/py/ypResults.py?stx=pies&stp=a&tab=&toggle=1&old_stxEsc=pies&e...> [retrieved May 4, 2004].

"CitySearch: Seattle, Washington," Citysearch.com, © 2004, <http://seattle.citysearch.com/?> [retrieved May 25, 2004].

"CitySearch: Search Tips," Citysearch.corn, © 2004, <http://seattle.citysearch.com /feature/39462/?> [retrieved May 25, 2004].

"Corbis," Pro.Corbis.com, © 2003, <http://pro.corbis.com/popup/Enlargement.aspx?mediauids={6e83d824-39dd-49d1-9ab0-913...> [retrieved May 4, 2004].

"Getty Images: Advanced Image Search,"*Getty Images*, © 1999-2004, <http://creative.gettyimages.com/source/search/AdvancedImageSearch.aspx>.

"Diginal Envoy Announces Strategic Alliance With Digital Island to Deliver Personalized, Accurate, Geo-Targeted Web Content to Internet Worldwide," Digital Envoy, Aug. 2, 2000 <http://www.digitalenvoy.com/news/press_releases/2000/pr_080200.shtml> [retrieved Apr. 13, 2004].

"Digital Envoy: NetAcuity," *Digital Envoy*, © 2004, <http://www.digitalenvoy.com/technology/netacuity.shtml> [retrieved Apr. 13, 2004].

"Digital Envoy: Applications," *Digital Envoy*, © 2004, <http://www.digitalenvoy.com/applications.html>.

"Digital Envoy: Customers," *Digital Envoy*, © 2004, <http://www.digitalenvoy.com/customers/customers.shtml> [retrieved May 4, 2004].

"Ron & Taylor's Big Road: Roadtrip," Rzweb.com, May 5-12, 2004 <http://www.rzweb.com/roadtrip/roadtrip.php> [retrieved Feb. 28, 2006].

* cited by examiner

METHOD AND SYSTEM FOR DISPLAYING ITEMS USING GEOGRAPHIC ATTRIBUTES

FIELD OF THE INVENTION

The present invention relates to displaying information regarding items, and in particular to displaying information using geographic attributes of the items.

BACKGROUND OF THE INVENTION

The advent of the Internet has unleashed new opportunities for consumers to use computer communication to search for products and conduct commercial transactions. For instance, the World Wide Web has developed to such a point where consumers can purchase virtually any kind of product by way of electronic commerce.

Traditionally, merchants and others conducting commerce via computer communication organize their products into databases according to standard attributes of the products. For example, online book sellers typically categorize books by their title, author, publisher, genre, and ISBN number, among other standard attributes. Sellers of pet supplies, for example, categorize their products according to the type of animal and type of product being provided, e.g., food, shelter, play toy, etc. Online clothing retailers categorize and present their products according to the gender and/or age of the person for whom the clothing is intended, the type of clothing, size, color, material, etc. In all these cases, and other circumstances in which products are sold, merchants and others rely on traditional categories to identify and present their products, and allow users to browse for products, using those categories. What is needed is a system and method that can analyze items for other attributes such as geographic attributes and present items to consumers that they might not otherwise have considered. Embodiments of the present invention address this need and other shortcomings that are present in the prior art.

BRIEF SUMMARY

In one exemplary aspect, embodiments of the invention provide a system and method for geographically displaying items that are available for commercial transaction. One method according to the invention comprises analyzing data associated with items to identify one or more geographic attributes of the items, and associating the identified geographic attributes with the items. A display may be provided on which an identified item is shown based on a geographic attribute of the item. In some embodiments, a map may be shown on the display on which an identified item is graphically represented by an indicator. The indicator may be positioned on the map based on a geographic attribute of the item.

In another exemplary aspect, embodiments of the invention can receive a criterion specifying a geographic attribute, and identify items that share a geographic attribute with the geographic attribute specified by the criterion. The items may be identified to a user, and if desired, the user may obtain an identified item in a commercial transaction. In yet another exemplary aspect, embodiments of the invention may provide an interface configured to receive a criterion specifying a geographic attribute. Further provided is a processing component in communication with the interface. The processing component is configured to search a catalog of items available for commercial transaction and identify one or more items in the catalog based on the geographic attribute specified by the criterion. Additionally, a display component can be configured to provide a map on which one or more of the identified items are displayed based on the geographic attribute specified by the criterion.

While not intuitive to users, using geography to identify and display items available for commercial transaction can provide users with a unique way of looking at items and conducting commercial transactions for such items. For example, when access to items is provided to a user in the form of a map, one or more items can be displayed on or near a geographic element in the map based on a geographic attribute of the items. For example, items related to El Paso, Tex., can be shown on a map of Texas, on or near the city of El Paso. Items having a geographic attribute relating to the Rhine river can be shown on a map of Germany on or near the Rhine river. A catalog of items can be prepared such that it is searchable using a geographic attribute derived from user interaction with the map. Furthermore, the map may be provided with a modifiable attribute, e.g., an attribute reflecting a geographic area shown by the map. In some embodiments, the user can directly modify an attribute of the map. In other embodiments, a map attribute is modifiable based on user interaction with an item. In yet other embodiments, modification of a map attribute modifies a geographic attribute used to identify items for display or on which a search of the items is conducted.

To facilitate the searching of items, a database may include one or more data structures for the items. The data structures may be prepared by analyzing items to identify geographic attributes of the items, associating the identified geographic attributes with their respective items, and generating or updating one or more data structures for the items in which the geographic attributes of the items are placed in a searchable field of the data structures. The data structures are searchable using a geographic attribute, e.g., to identify geographically related items.

The present invention includes many additional aspects and features that can be included separately or in combination with embodiments described herein or other embodiments of the invention. Further detail regarding these aspects and features is provided below.

DETAILED DESCRIPTION

Figure 1:
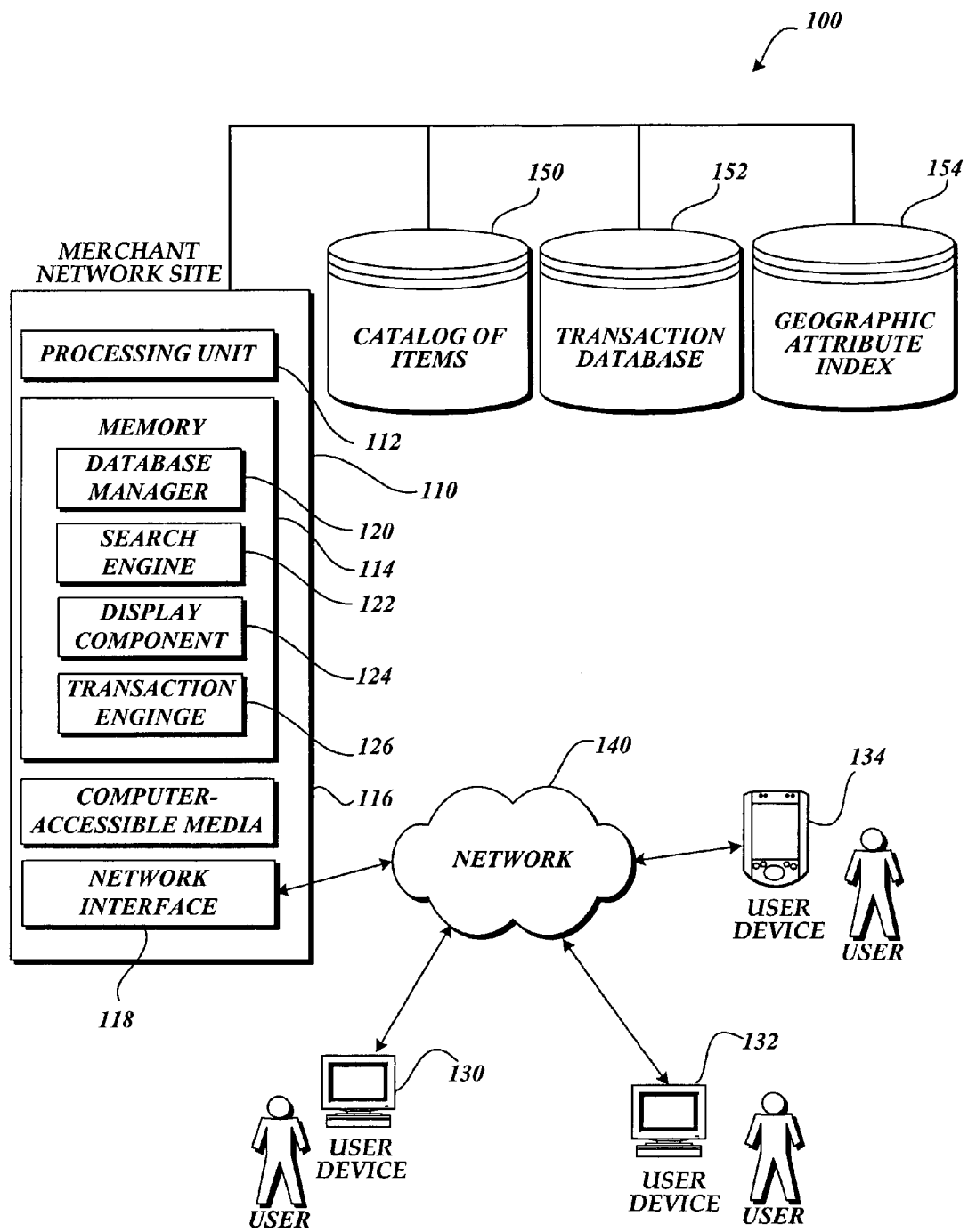
FIG. 1 is a pictorial diagram of one exemplary computing environment in which embodiments of the present invention may be implemented.

Embodiments of the invention described herein are generally directed to methods, systems, and computer-accessible media for geographically displaying items or attributes of items. For example, in some embodiments, geographically related items may be identified and displayed based on one or more geographic attributes of the items. Although specific embodiments will be described with reference to the drawings, these embodiments are intended to illustrate, and not limit, the, present invention. Furthermore, persons skilled in the relevant art will recognize that the invention can be practiced with or without one or more of the specific details described herein, and/or combine aspects of the invention with other methods, components, systems, data structures, etc., and still achieve the advantages provided by the present invention. The scope of the invention, therefore, should not be determined from the following illustrative embodiments, but instead from the claims that follow and equivalents thereof.

It should also be understood that references throughout the specification to "one embodiment" or "an embodiment" means that the described feature, structure, or characteristic is included in at least one embodiment of the present invention. References to "one embodiment" or "an embodiment" in this specification do not necessarily refer to the same embodiment. Particular features, structures, or characteristics may be combined in any suitable manner to form various additional embodiments of the present invention.

In addition, for the sake of simplicity of explanation and illustration, this specification uses various general terms when discussing exemplary embodiments of the invention. For example, the term "item" is used herein to generally refer to goods or products that are available for commercial transaction. A commercial transaction can include any form of exchange between parties whether or not for money, barter, or other stated value. The term "item" does not include services provided by service providers (examples including, but not limited to, wireless internet access providers, car rental services, restaurant services, retail services, hotel accommodations, etc.). A "catalog" as used in some embodiments herein can refer to any collection of items, or descriptions or content of items, whether stored in a single repository or in multiple distributed repositories that may be located remotely from each other. A "geographic attribute" can refer to any information, such as but not limited to, a reference, code, sign, coordinate, etc., that may be used to identify a geographic location, element, feature, area, etc., either directly or indirectly. As will be understood from the description herein, geographic attributes of items may be identified and placed in a searchable field of a data structure for the respective items. Furthermore, unless otherwise explicitly stated herein, references to "a" or "an" can mean one or more of the referenced subject matter.

Turning now to FIG. 1, an example of a computing environment 100 is provided in which an embodiment of the present invention can be implemented. The computing environment 100 in this illustration includes a processing component, such as a merchant network site 110, in communication with a variety of storage repositories holding databases 150, 152, and 154 that will be described in greater detail below. The network site 110 is also shown in communication with a variety of user devices 130, 132, and 134 via a network 140. Examples of the network 140 may include a local area network, wide area network, or global network, such as the Internet. The user devices 130, 132, and 134 are each preferably configured to allow users who are operating the devices to interact with the merchant network site 110 via the network 140.

Persons having ordinary skill in computer technologies will recognize that any suitable communication system and/or protocol may be used to provide the computer communication depicted in FIG. 1. For instance, the computer communication provided by the network 140 may conform to TCP/IP standards that are well known in the art. If employed in a Web environment, embodiments of the invention may use hypertext transfer protocol and/or file transfer protocol or other suitable protocols for the exchange of instructions, information, and data.

In FIG. 1, the network site 110 is shown including a processing unit 112, a memory 114, a computer-accessible media drive 116, and a network interface 118. The network interface 118 includes suitable hardware and software to enable communication between the network site 110 and the user devices 130, 132, 134 via the network 140. Of course, the network site 110 may include other systems and components not shown, such as input devices (keyboard, mouse, etc.) and output devices (display screen, printer, etc.). The memory 114, in this example, may be comprised of volatile and/or non-volatile storage, including RAM, ROM, computer accessible media or devices, or a combination thereof. The memory 114 typically contains data, information, and instructions that are used by the network site 110 to operate in accordance with the present invention. In this illustration, the memory 114 includes a database manager 120, a search engine 122, a display component 124, and a transaction engine 126. Various features and details concerning each of these exemplary elements in the memory 114 will be described below.

As noted earlier, the network site 110 may be communicatively connected to various storage repositories, here illustrated as databases including a catalog of items 150, a transaction database 152, and a geographic attribute index 154. Aspects and features of these databases, as well as usage of these databases, will be described in greater detail below and will be better understood in the context of the flow diagrams provided in FIGS. 2 and 3. In brief, the catalog of items 150 may be a database that contains a collection of data structures that hold item description information and attribute data relevant to items in the collection. The catalog of items 150 may also include items themselves, or contents of the items, as may be stored and retrieved in one or more repositories. One example of a catalog that includes media items (among other items) may contain some or all of the text, graphics, audio, and/or video content that may be included in the media items, as well as bibliographic and attribute data relevant to the media items. The database manager 120 may include software and hardware components as known in the art to generate, modify, update, and maintain the databases 150, 152, 154.

The transaction database 152 is optional and may be employed by the transaction engine 126 to facilitate commercial transactions between the merchant network site 110 and consumers using the user devices 130, 132, and 134. The geographic attribute index 154 may also be optionally employed by the search engine 122 to facilitate faster searching of items in the catalog of items 150. For example, the geographic attribute index 154 may include a specialized index of geographic attributes for which items in the catalog of items 150 may be searched and identified.

Figure 2:
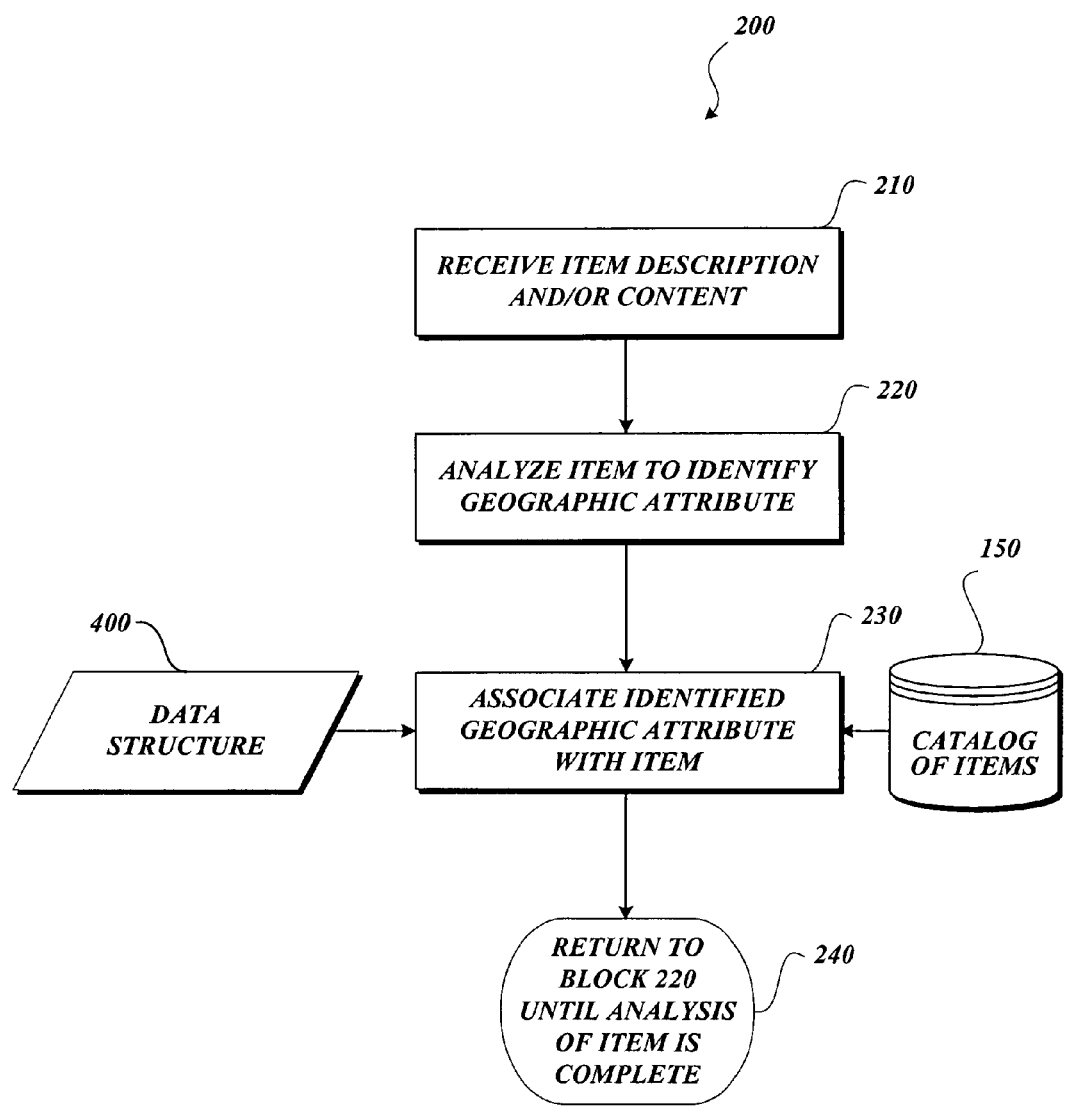
FIG. 2 is a flow diagram illustrating a process for analyzing items and associating geographic attributes with items in accordance with an embodiment of the present invention.

FIG. 2 illustrates a flow diagram of one exemplary method 200 that provides a process for analyzing items and identifying geographic attributes of items for later searching and identification processes, e.g., as described in FIG. 3. The method 200 begins at block 210 in which a processing component, such as the merchant network site 110 shown in FIG. 1, receives an item for analysis, which may, for example, include receiving a description of the item and/or content of the item itself. At block 220, the item description and/or content is analyzed to identify one or more geographic attributes of the item. An item description may originate with a maker of the item (e.g., a manufacturer of a product), or with a party to a commercial transaction (e.g., a merchant or other seller or a user). An item description may alternatively originate with a third party to a commercial transaction for the item. Various examples of an item analysis that may be conducted in this regard are described later herein. If desired, analysis of an item description or content may be conducted in an automatic and programmatic manner, without requiring input from a user.

Geographic attributes that result from the analysis step 220 are then associated with the analyzed item, as indicated at block 230. In one exemplary embodiment, associating an identified geographic attribute with an item may include generating (or locating and updating) a data structure 400 (FIG. 4) that has one or more searchable fields for holding geographic attributes. The identified geographic attributes are placed in the data structure for the item. The resulting data structure 400 may be stored, e.g., in the catalog of items 150, for later searching and identification of the item.

Identifying and associating geographic attributes with items allows users to use geography to identify related items in interesting ways. As previously noted, conventional techniques for searching and viewing products all rely on searching and viewing standard attributes of the products, such as title, author, publisher, etc., in the case of a book. A book such as "On the Road" by Jack Kerouac or "The Firm" by John Grisham may refer to various geographic locations in the content of the book or in descriptions about the book. In conventional systems, a user considering a purchase of "The Firm," for example, may be presented with options to obtain other John Grisham novels. With the invention, however, the user may be presented with options to obtain geographically related items, such as a box of Sticky Finger's Memphis Original Barbecue Sauce, an audio CD titled "Symphonic Elvis," a certificate to enter the Rock 'N Soul Museum, and/or other items that have a geographic relationship with the book, "The Firm." In this particular example, the geographic relationship is that much of the book "The Firm" is set in Memphis, Tenn., which may be recognized by the analysis step 220 in FIG. 2 as a geographic attribute of the book. Analysis of these other aforementioned items also identifies Memphis, Tenn., as a geographic attribute of the items. Because the items share the geographic attribute of Memphis, Tenn., the items may be presented to a user as geographically related items. The analysis performed in step 220 of FIG. 2 may use any of a variety of algorithms to identify geographic attributes of items. These algorithms may be programmed into a proprietary computing system if desired, or may derive from processes provided by products that are presently commercially available. One example of a commercially available product that can be used in this aspect of the invention can be obtained from MetaCarta, Inc., based in Cambridge, Mass. MetaCarta offers software products that are configured to review text of documents and identify natural language references to geographic locations. According to information obtained MetaCarta, MetaCarta's software performs three main steps. First, it analyzes a document (which may be an item or a description of an item in the context of the present invention). A document may be analyzed to identify all words and expressions such as "Paris" that can be matched with geographic entities having assigned longitude and latitude coordinates. MetaCarta calls this process geoparsing.

Second, a combination of database queries and processing methodology is used by MetaCarta to find the actual coordinates of referenced geographic entities or locations. In the case of "Paris," MetaCarta's software attempts to determine from the document whether the author more likely meant Paris, France, or one of many other locations in the world named "Paris," such as Paris, Idaho or Paris, Tex. The software can analyze the text of the document to determine the context of the geographic reference so that a different "Paris" can be chosen if that location was more likely intended by the author.

It should be noted that other expressions that refer to places may be more ambiguous and vague, yet susceptible to analysis for determining geographic attributes according to the invention. The aforementioned MetaCarta software includes processes for assigning confidence rakings to the possible meanings of location references in a process called grounding. For MetaCarta, this involves parsing natural language expressions and reviewing databases of locations, location names, and linguistic statistics.

Thirdly, information obtained from MetaCarta indicates that the MetaCarta software uses geographic coordinates derived from the foregoing steps to make the analyzed document accessible in a geographical search. A search may be conducted via a map (e.g., as described later herein), in addition to conventional keyword and time-range searching MetaCarta calls this process "geoindexing," and depending on the particular solution used, some indexing of geographic attributes may be algorithmically faster for searching than other indexes and databases.

In one aspect, string matching may be used to solve the geoparsing problem referenced above. The analysis process indicated at step 220 in FIG. 2 may include maintaining a list of geographic words such as "Seattle," and phrases such as "Mexico City." When analyzing an item that contains text, the analysis process 220 may identify sections of the item having text that matches an entry on the list. The list can be very large, for example, including up to millions of entries. While searching a list of this magnitude presents some technical challenges, string matching is a classic and well-understood functional process. MetaCarta reports that its software employs fundamental string matching techniques that are used by all state-of-the-art natural language processing systems. It also includes refinements to handle punctuation, approximate matching to catch spelling variants, etc.

In some circumstances, string matching can have limited success. A list of geographic words and phrases, as referenced above, may encompass entries that are not only place names but also ordinary words. As MetaCarta describes the challenge, there are towns called "Normal," both in Cuba and in Colombia, as well as a stream called "English" in Canada. There is even a mountain ridge in New Caledonia called "The." An overlapping of place names and ordinary words can lead to spurious matches or false positive that, as described below, can be addressed.

A related source of false positives is the widespread use of descriptive phrases for which a geographic connection is no longer applicable. For example, "London Broil" is a specific cut of beef that no longer has a geographic connection to the city of London.

Even if all place names were easily listed, a list of geographic words and phrases may be innumerable. References such as "three miles south of Kandahar" and "thirty-eight kilometers north-northwest from Pearl Harbor" can be used to reference a geographic location. Depending on the manner in which the analysis process in step 220 is configured, false positives can be traded off against false negatives. For example, at one extreme, if the analysis reported every matched string as geographic, the analysis has not missed any positive hits, but may have many false negatives. To the other extreme, if the analysis reported no matching strings as geographic, the analysis has no spurious hits but may have many missed positives.

To deal with challenges such as these related to string matching, solutions such as the software provided by MetaCarta may go beyond simple string matching when identifying geographic attributes of an item. For example, MetaCarta reports that algorithms employed in its software applies pattern matching techniques to find geographic candidates. For example, text may be analyzed to find phrases that fit a pattern such as "X miles south of Y" (which is likely to be considered a geographic attribute). Pattern matching algorithms themselves may be mathematical generalizations of string matching algorithms, and may use the same technical methods discussed above with respect to string matching. MetaCarta's software can also analyze the context of geographic expressions, as will be discussed next in this specification.

The item analysis discussed thus far has addressed the issue of whether a given piece of text (or other element or aspect of an item or a description of an item) is geographic and thus a candidate for being identified as a geographic attribute of the item. An item may include text such as "We took a plane to Abbeyville." While the last word is geographic, the process must determine which Abbeyville was meant: the one in North Carolina, the one in Ireland, or possibly the ghost town in Arizona. Grounding is a process that may be used in step 220 to determine which reference is most likely meant, and thus lead to determining the longitude and latitude of the place referenced.

In some circumstances, context-based disambiguation of geographic references in an item can rely on information surrounding the geographic reference in the item. In a statistical sense, an immediate context (i.e., the words immediately preceding and following a candidate geographic reference at issue) is typically most useful. However, analysis of the entire item may be necessary to determine both the proper context and the most likely meaning for a geographic reference.

Analysis techniques, such as those used by MetaCarta, may employ statistical machine learning that can estimate and quantify the impact of contextual factors on a candidate word or phrase. For example, MetaCarta indicates that its software uses numerical parameters corresponding to the degree of contextual impact of words and phrases. These numerical parameters have been developed based on analyses conducted on a large corpus of open source data. These analyses provide statistics about place names as used in real discourse. Software solutions such as the one from MetaCarta can also fine tune themselves by analyzing further known items that highlight the kind of place names found in items of interest. Once an appropriate context is determined and the candidate place name is grounded, the place name can be associated with the item as a geographic attribute of the item, as indicated at step 230 in FIG. 2.

Items that include audio and video aspects may also be searched using known pattern matching techniques similar to those techniques described above. A segment of audio or a frame of video may include elements indicative of a geographic location. For instance, data resulting from a frequency and time analysis of an audio segment may be compared with frequency and time data for known audio indicating a geographic location (e.g., the spoken word "Omaha" may be identified in audio using known audio samples or patterns for the word). Similarly, a video image may be analyzed using known techniques, such as frequency and/or wavelet transformation techniques, to identify edges and isolate elements in the video image. The isolated elements may then be compared against known shapes of objects having a geographic location. For example, the Eiffel Tower has a unique shape that may be identified in a video image. The image is then associated with the geographic attributes "Paris, France" and possibly also "Eiffel Tower."

Figure 4:
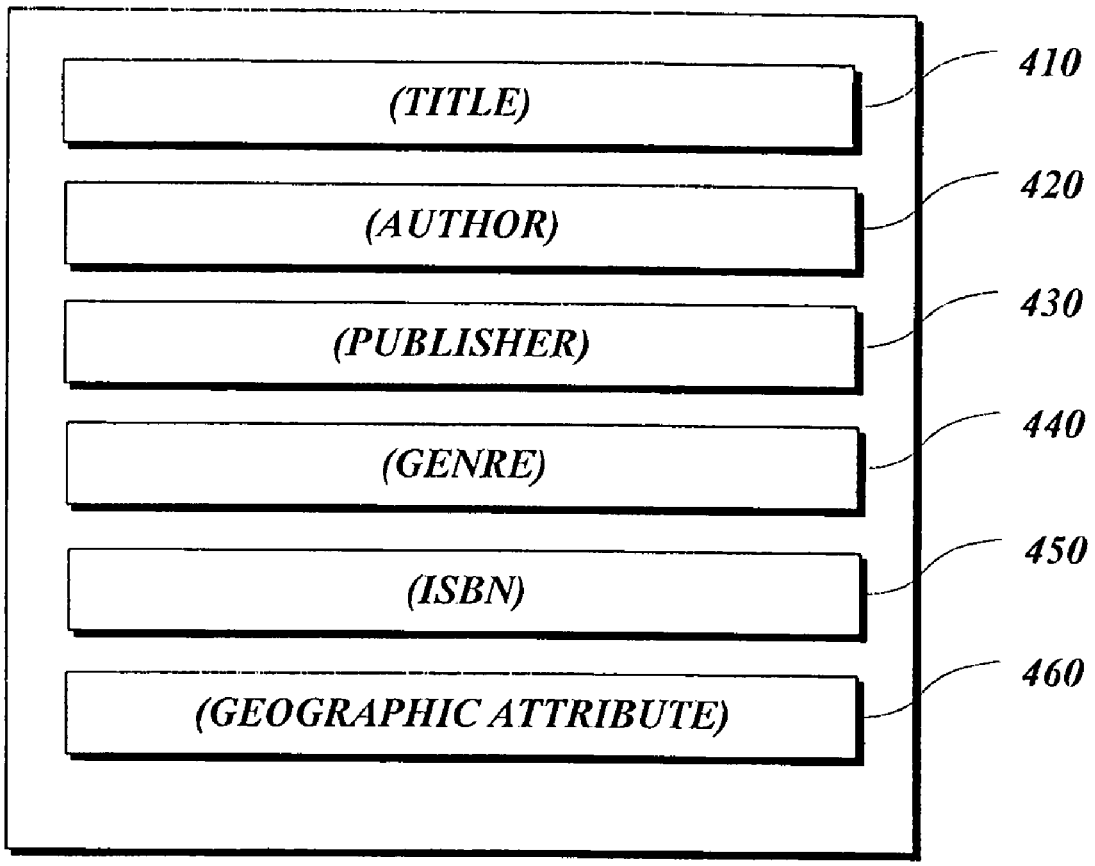
FIG. 4 is a pictorial illustration of an exemplary data structure that may be used in an embodiment of the present invention.

Association of an identified geographic attribute with an item, as indicated at step 230, may be accomplished using any of a variety of different types of data structures. One example of a data structure 400 for a book item is shown in FIG. 4. Of course, other types of items may employ other data structures having different fields than shown in FIG. 4. The data structure illustrated in FIG. 4 includes a title field 410, an author field 420, a publisher field 430, a genre field 440, an ISBN field 450, and geographic attribute field 460. It should be understood that this listing of fields is not exhaustive of the fields that may be used in a data structure for book items, but is exemplary only.

Of greater interest to the present specification is the geographic attribute field 460 in which one or more geographic attributes identified by the analysis process 220 may be stored. The geographic attributes stored in the field 460 may, for example, be actual place names. In other embodiments, such as an embodiment using the MetaCarta software discussed above, the geographic attribute field 460 may include latitude and longitude coordinates of identified geographic places. In any event, data structures generated or updated to include a geographic attribute for an item may be stored in the catalog of items 150, as illustrated in FIG. 2, or in other suitable data repositories. If the analysis of the item is not yet complete and includes additional description or content that has not yet been analyzed, the processing of the method 200 may return to block 220, as indicated at reference numeral 240.

FIG. 1 further illustrates an optional database 154 with a geographic attribute index. The index 154 may be used by the search engine 122 to facilitate faster searching of items in the catalog 150 based on a geographic attribute. In one embodiment, geoindexing as described by MetaCarta may be used to construct the geographic attribute index 154. MetaCarta's software reportedly employs a full-text document index that is specially optimized for geographic queries. The index may also include keywords, timestamps, and arbitrary metadata so that the index can be easily coupled with any item repository. The geographic attribute index 154 may also be constructed to facilitate identification of one or more items from the catalog 150 for display in accordance with the present invention.

As noted by MetaCarta, text data and geographic data can be viewed as fundamentally different data types. For example, text is discrete. Geographic data, on the other hand, may be represented in a continuous vector space. Words are strings of symbols, wherein typical searches on collections of words involve pattern matching a search string against strings in the collection. On the other hand, locations may be viewed as geometric entities in a Euclidean vector space, wherein typical searches involve finding locations within a range or within a certain distance of another entity. If a map is used to specify a region of interest, then moving the edge of the map by even a small amount may represent a new region of interest, requiring a new search of the catalog 150.

A geographic attribute index 154 created using MetaCarta software contains both data types in a single index, enabling fast searching of the index. The data can be arranged at the time the index is created so that when user queries are processed, both types of data (text and geographic data) are treated similarly. The algorithmic processing employed can handle both geographic and non-geographic restraints in the user query.

For purposes of further reference and attribution, the foregoing description of MetaCarta's software is derived from a document accessible at http://www.metacarta.com/technology/index.html. Persons of ordinary skill in the art wishing to know about MetaCarta's software can refer to the Web site at www.metacarta.com. Of course, persons of ordinary skill in the art will also recognize that other solutions and systems may be used to accomplish the analysis and association steps described at blocks 220 and 230 in FIG. 2, as well as the searching and identification steps described below at blocks 320 and 336.

Figure 3:
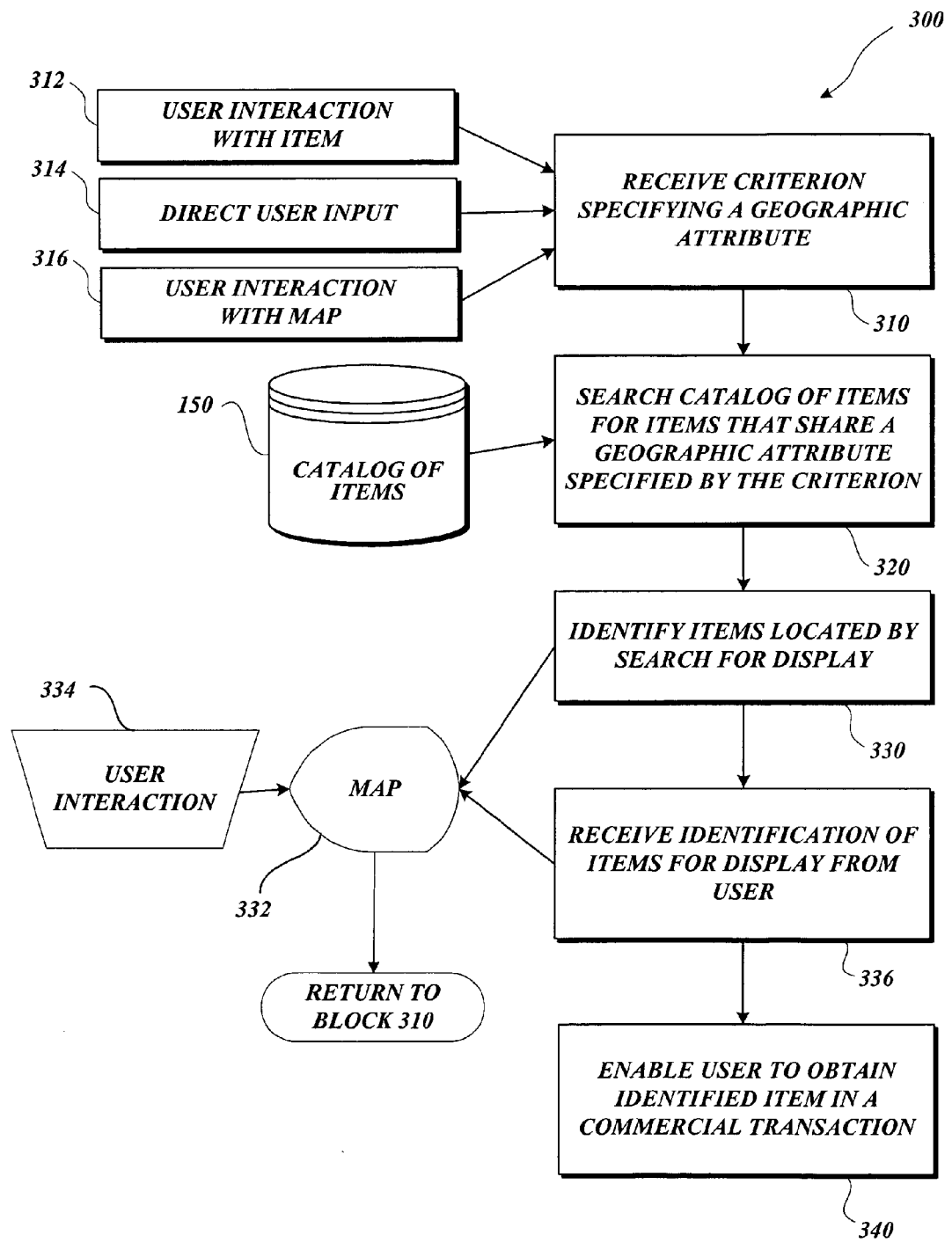
FIG. 3 is a flow diagram of a process for searching and identifying items in a catalog of items based on a criterion specifying a geographic attribute in accordance with an embodiment of the present invention.

FIG. 3 illustrates an exemplary method 300 that may be used to identify items in a catalog of items that share a geographic attribute. As indicated at block 310, the method 300 begins by receiving a criterion that specifies a geographic attribute. In the context of this embodiment, the term "criterion" can be any characters, words, phrases, signs, or codes of geographic origin or indicative of a geographic location. A criterion may be received, for example, from a user via the network 140 and network interface 118 shown in FIG. 1.

A criterion may specify one or more geographic attributes explicitly or implicitly. For example, embodiments of the present invention may organize geographic attributes into a hierarchy. Geographic attributes at a higher level in the attribute hierarchy may implicitly include geographic attributes organized under the higher level geographic attribute. For one exemplary illustration, a hierarchy of geographic attributes may include (in order from lowest to highest): address, street, neighborhood, city, state, region, and country. For example, a building at a specific address on Bourbon Street may be found in the French Quarter of New Orleans in the state of Louisiana, which is located in the southern states region of the United States of America. If, for example, at block 310 the method 300 receives the criterion "New Orleans," the criterion may be considered explicitly specifying the city of New Orleans, as well as implicitly specifying the French Quarter and Bourbon Street as well as the building address (which are lower in the hierarchy). Items in the catalog of items 150 may be searched based on the multiple geographic attributes specified by the "New Orleans" criterion. Other embodiments of the invention may be configured to search items only for explicitly specified geographic attributes.

Figure 5:
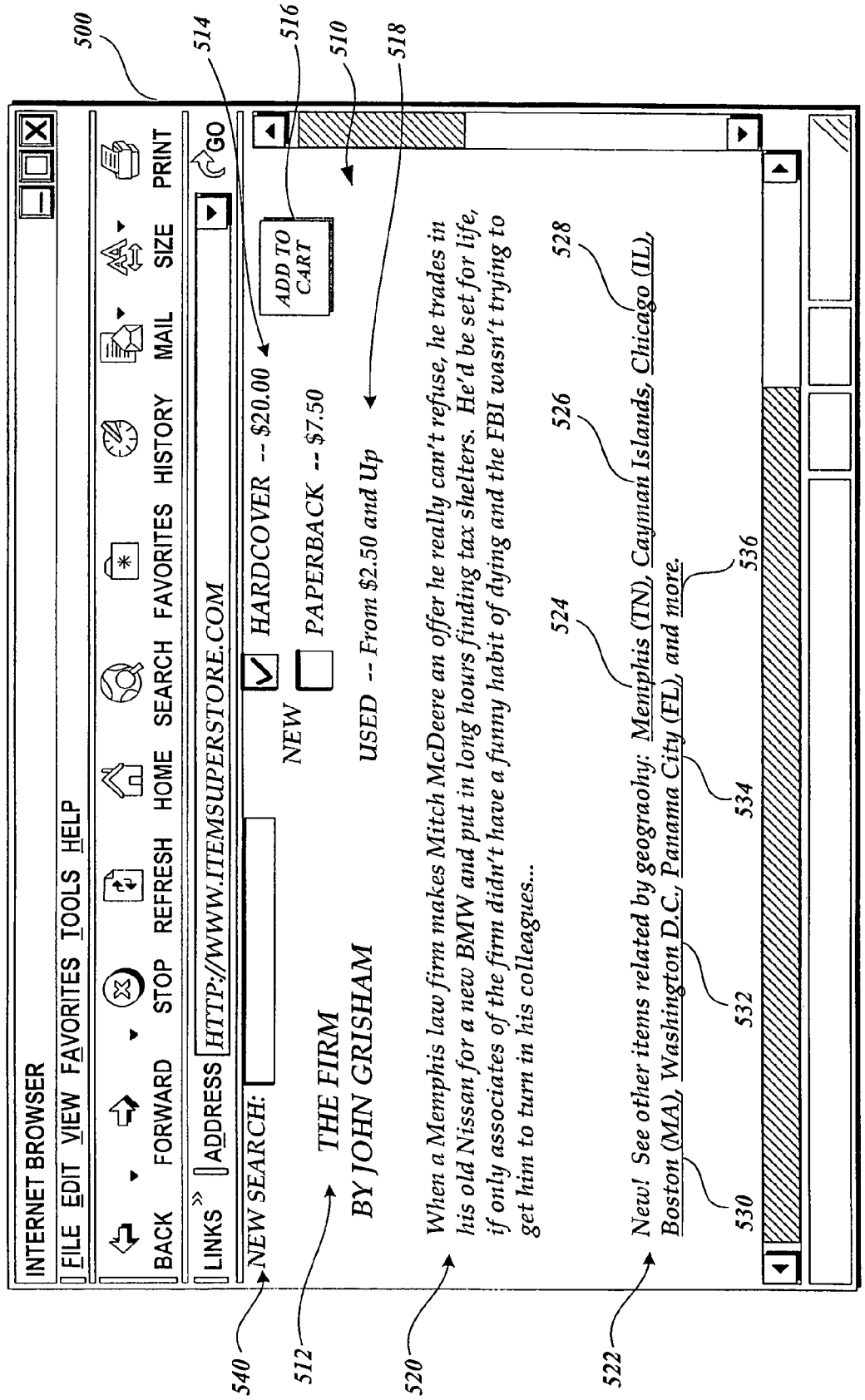
FIG. 5 illustrates an exemplary Web browser with a Web page showing information for an item in a catalog of items.

As indicated at blocks 312, 314, and 316, criteria may be received at block 310 in a variety of ways. For instance, as indicated at block 312, a user may interact with an item in a way that provides a criterion specifying a geographic attribute. One example to be described in greater detail below is shown in FIG. 5 in which a Web page for a book item provides a user an opportunity 522 to "see other items related by geography" and lists several geographic locations 524-534 that the user can select.

Figure 6:
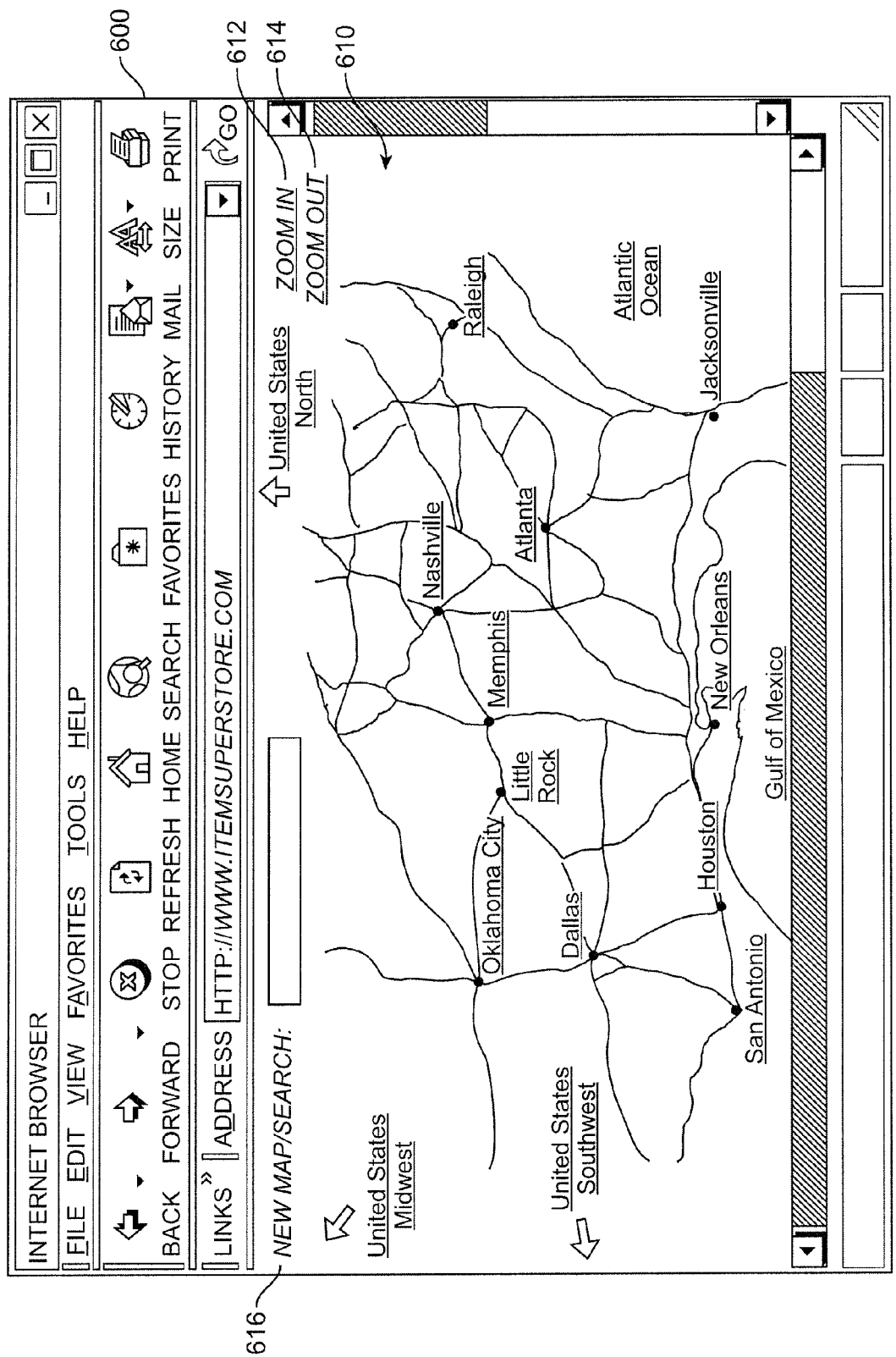
FIG. 6 illustrates an exemplary Web browser with a Web page showing a map of southern states in the United States with geographic attributes.
Figure 7:
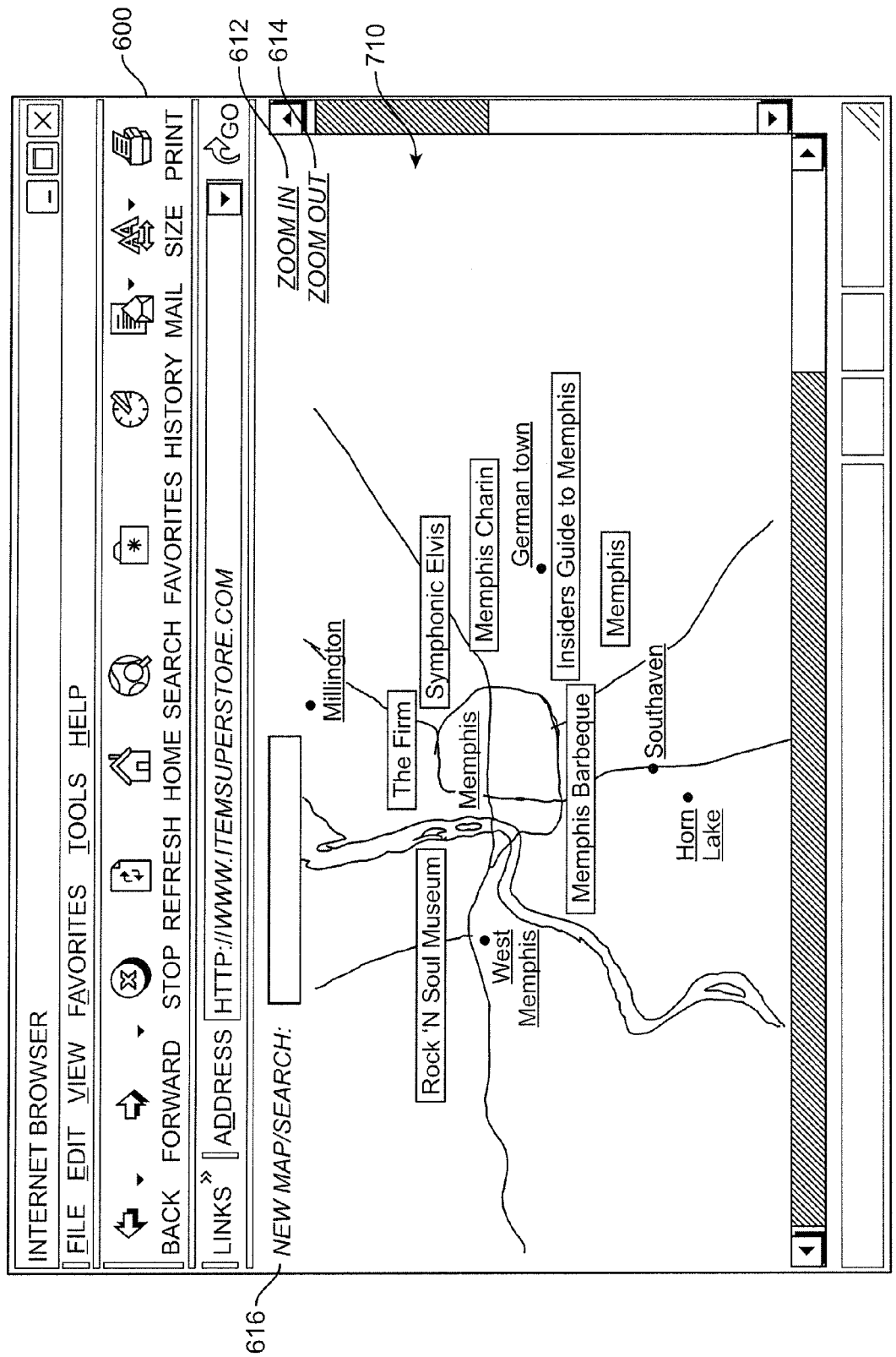
FIG. 7 illustrates an exemplary Web browser with a Web page showing a map of Memphis, Tenn. and geographically related items from a catalog of items.
Figure 8:
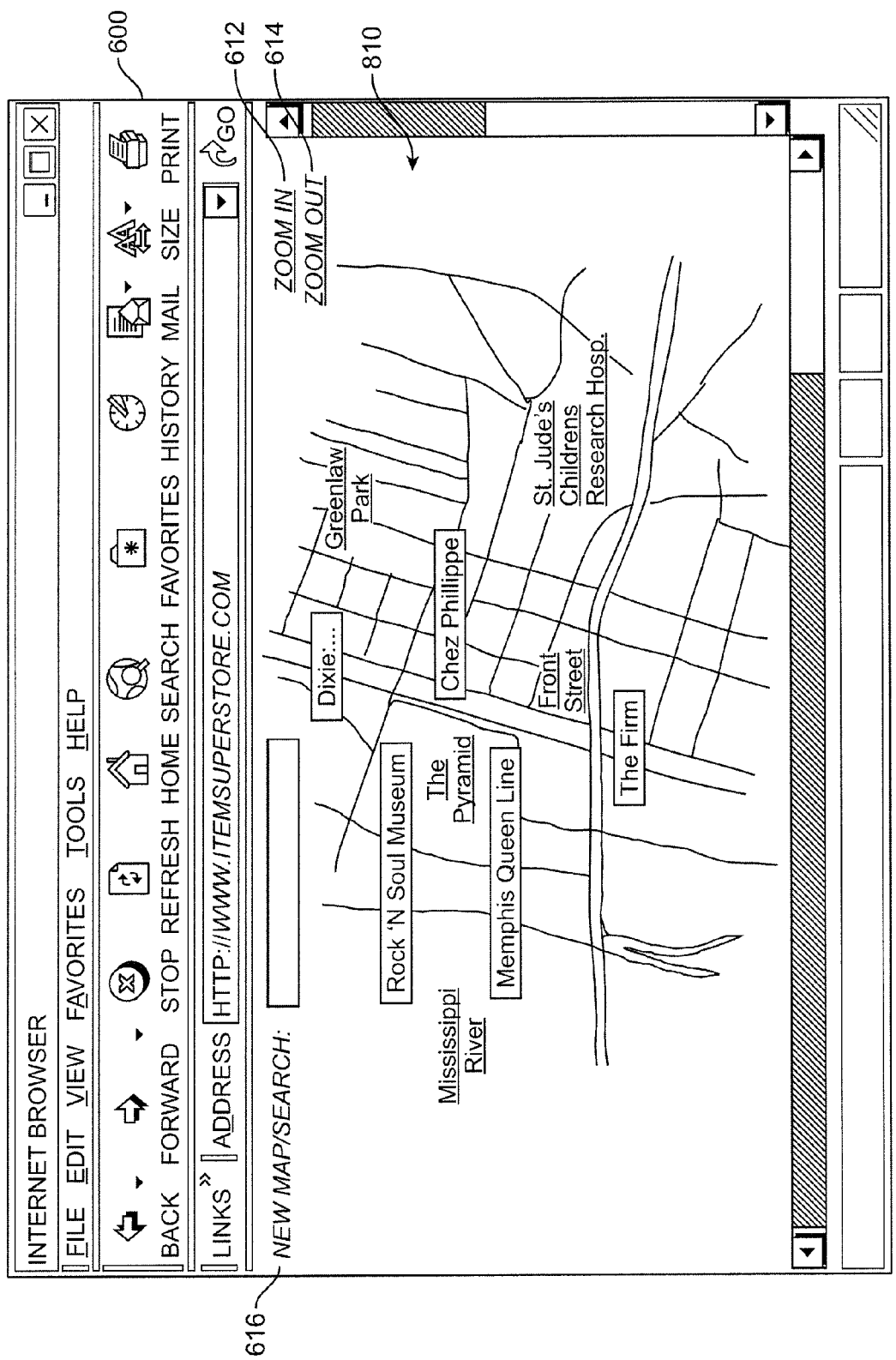
FIG. 8 illustrates an exemplary Web browser with a Web page showing a map of downtown Memphis and geographically related items from a catalog of items.

Block 314 in FIG. 3 indicates that a criterion may be received at block 310 from direct user input. One example of this is shown in FIGS. 6-8 in which an entry field enables a user to submit a criterion specifying a geographic attribute for a new map display.

Another possible way in which a criterion may be received at block 310 is through user interaction with a map provided to the user, as indicated at block 316. One example of this is shown in FIGS. 6-8 where a user is able to zoom in, zoom out, and/or click on a geographic attribute identified on a map. In any case, it should be well understood that other embodiments of the invention may employ other mechanisms and ways in which a criterion specifying a geographic attribute may be received.

Once a criterion is received at block 310, the method 300 continues at block 320 where a search of the catalog of items 150 is conducted to locate items that share a geographic attribute specified by the criterion. Any number of known searching technologies may be employed in this aspect of the invention, including the index searching provided by software from MetaCarta, Inc. as previously described. The catalog of items 150 and/or the geographic attribute index 154 may be comprised of data structures having searchable fields that include geographic attributes, such as the attribute field 460 shown in FIG. 4. Prior to searching, geographic attributes specified by criteria received at block 310 may need to be resolved to a common system of reference, such as longitude and latitude coordinates, depending on the format of the geographic attribute(s) stored in the attribute field 460.

Items that are located by the search in block 320 may then be identified to a user, as indicated at block 330. While items may be identified to a user in a list or table format, many users may find it interesting and informative to visually observe a map in which items are graphically shown on the map, as indicated by map output 332. Examples of a graphical map output are illustrated in FIGS. 6-8. As will be described below, a map 332 may include one or more map attributes that can be modified, in some cases by user interaction 334 with the map. If, by user interaction 334 with the map 332, one or more attributes of the map are changed, or if a user interacts with elements or items shown on the map 332, the user interaction 334 may result in receipt of a new criterion specifying a geographic attribute for which processing is returned to block 310.

Figure 9:
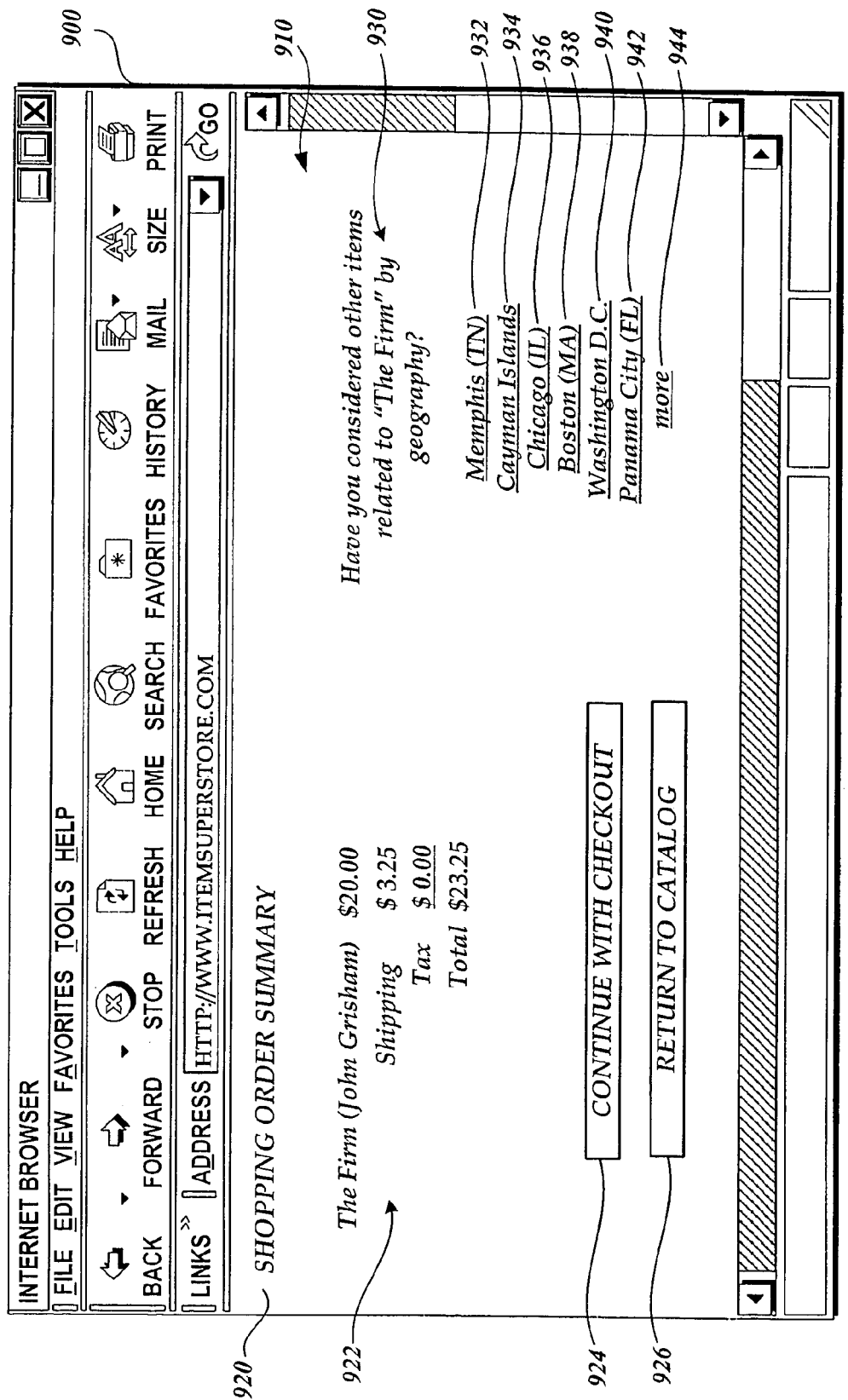
FIG. 9 illustrates a Web browser with a Web page showing an exemplary commercial transaction and options to select a geographic attribute for identifying additional items in accordance with an embodiment of the present invention.

In addition to identifying items located by a search of the items in the catalog of items 150, processing at block 330 may proceed to block 336 at which the user may identify one or more items for display, to the extent such identification and display of items was not performed at block 330. At block 340, the user is able to obtain one or more of the identified items in a commercial transaction. As noted earlier with respect to FIG. 1, a processing component at the merchant network site 110 may include a transaction engine 126 that enables users to obtain items in commercial transactions. The transaction engine 126 may be comprised of executable instructions that, when executed by the processing unit 112, cause the network site 110 to communicate externally with a user at a user device 130, 132, 134, and communicate internally with a transaction database 152, to enable the user to obtain an item in a commercial transaction. One example of a Web page that may result from processing a commercial transaction is illustrated in FIG. 9. Systems and processes for online commerce, including electronic shopping, checkout, and payment systems are well known to persons in the field of electronic commerce.

As should be appreciated, embodiments of the invention may be implemented in a variety of environments. In one suitable environment, embodiments of the invention operating via the Internet may provide Web pages to users and receive queries, data, and information from users via the Internet. Conventional Web browsers operating at user devices, such as the devices 130, 132, 134, shown in FIG. 1, may be used to display Web pages provided by a processing component, such as the merchant network site 110.

FIG. 5 illustrates an exemplary Web browser 500 displaying a Web page 510 to a user. In this illustration, the Web page 510 is a detail page showing information about a book item titled "The Firm" by John Grisham. The title information is identified generally at reference numeral 512.

At reference numeral 514, the user is presented with options to obtain a new version of the book, if desired. After checking one of the check boxes next to "hardcover" or "paperback," the user may click on an "add to cart" button 516 to place the selected book into a shopping cart for later checkout. Alternatively, a user may be presented with an option to obtain a used copy of the book, as indicated at reference numeral 518.

At reference numeral 520, the Web page 510 provides additional description about the book item. This description, along with or in place of the content of the book, may be analyzed at step 220 in FIG. 2 to identify one or more geographic attributes of the book item. Assuming an analysis of the entire content of the book "The Firm" was conducted, and identified geographic attributes were associated with the book, the Web page 510 provides an opportunity to a user to see other items that are related to the book by geography, as indicated at reference numeral 522. In this instance, geographic attributes for the book item at issue include Memphis (TN) 524, Cayman Islands 526, Chicago (IL) 528, Boston (MA) 530, Washington D.C. 532, and Panama City (FL) 534. If additional geographic attributes have been associated with the item, user selection of an additional link 536 (here, titled "more"), may cause an additional listing of geographic attributes of the book item to be shown to the user.

The geographic attributes 524, 526, 528, 530, 532, and 534 are each illustrated in FIG. 5 as a hypertext link that, when selected by a user (e.g., by clicking on the selected attribute), the geographic attribute is communicated and received as a criterion for a search of geographically related items in the catalog of items 150. Processes for receiving a criterion specifying the geographic attribute, and searching a catalog of items for items that share the geographic attribute specified by the criterion, are described above in relation to blocks 310 and 320 of FIG. 3.

An additional feature illustrated in FIG. 5 is indicated at reference numeral 540, wherein a user can commence a new search for a specific item or for geographically related items by entering a search query in a designated entry field. If the search query at reference numeral 540 provides a criterion specifying a geographic attribute, the criterion may be received by the processes defined at blocks 310 and 320 for searching of the catalog of items 150. If desired, the Web page 510 may also include additional features for users to log in and log out, etc.

FIGS. 6-8 illustrate an exemplary Web browser displaying maps, geographic attributes, and geographically related items identified from the catalog 150 in accordance with one implementation of the present invention. As illustrated, access to the catalog of items 150 may be provided in the form of a map, wherein items in the catalog are searchable using a geographic attribute. The geographic attribute used to search for items may be derived from user interaction with the map. For example, a user having the desire to search and possibly obtain items related to the southern region of the United States may view the map 610 shown in the Web browser 600 in FIG. 6. The map 610, as will the maps 710 and 810 discussed below, may be generated by the display component 124 shown in FIG. 1.

The map 610 includes depictions of numerous geographic attributes. Some geographic attributes indicate particular geographic locations, including cities, such as Dallas, Little Rock, Memphis, Nashville, and Atlanta, among other cities. Other geographic attributes on the map 610 indicate natural geographic features, including the Gulf of Mexico and the Atlantic Ocean. The map 610 further includes geographic attributes that indicate a geographic area, which in this example provide a direction of navigation to geographic areas including the United States-North, United States-Midwest, and United States-Southwest. In this particular embodiment, the geographic attributes are illustrated as hypertext links that, when selected by a user, provide a criterion specifying the geographic attribute for searching items in catalog of items 150.

The map 610 also includes various controls that allow a user to modify one or more attributes of the map displayed in the Web browser 600. For instance, a zoom-in control 612, when selected by a user, may cause the display component 124 to provide a map defining a geographic area on a scale that is smaller than the map 610 currently provided by the display component. User selection of a zoom-out control 614 may cause the display component to provide a map defining a geographic area on a scale that is larger than the map 610 currently provided by the display component. An entirely new map and/or search of items in the catalog of items 150 may be initiated by providing a search query in the input field defined at reference number 616. The search query may include, for example, a new geographic attribute that becomes the focus of the search and the new map. Clicking on one of the illustrated arrows may also cause a new map of a different geographic region to be shown.

While the map 610 may provide controls 612, 614, and 616 to enable a user to directly modify attributes of the map 610, there are other ways to modify an attribute of the map as well. For example, the focus of a map (e.g., Memphis for the map 710), as a map attribute, may be modified based on user interaction with an item shown on the map. The user may click on an item that has one or more different geographic attributes associated therewith. A new geographic attribute obtained from user interaction with an item may initiate a new search of the catalog 150 and display of a map with a new focus by the display component 124.

Continuing with the example shown in FIG. 6, if a user selects the hypertext link for Memphis (or alternatively, selects the zoom-in control 612 and focuses on Memphis), the display component 124 may provide a map 710, as shown in FIG. 7, depicting a closer view of Memphis to the user. FIG. 7 further illustrates a graphical display of items in the catalog of items 150 that, in this case, share the geographic attribute of Memphis. Indicators, such as representations of the items, may be shown on or near a geographic element, such as the city of Memphis, as illustrated. For instance, a search of the catalog of items 150 based on the geographic attribute "Memphis" may return items such as a certificate for entry into the Rock 'N Soul Museum (tourism item), The Firm (book item), Symphonic Elvis (audio item), Memphis Charm (jewelry item), Memphis Barbeque (food item), Insider's Guide to Memphis (book item), and Memphis (movie item). The map 710 also includes other geographic attributes, including the cities of Millington, Germantown, South Haven, West Memphis, and Memphis, that may be selected by the user to change the focus of the map 710.

Suppose, for example, a user viewing the map 710 wishes to identify items relating to "Front Street" in the city of Memphis, the user may click on the geographic attribute "Memphis" in the map 710, and then on the "Front Street" attribute shown in the map 810 depicted in FIG. 8. Alternatively, the user may enter "Front Street Memphis" into the new map/search field 616. As a result of this action, the user may be presented with a new map 810 depicting a closer view of downtown Memphis, as shown in FIG. 8. A new search of the catalog of items 150 may also be conducted based on the criterion specifying the geographic attribute "Front Street."

For instance, the map 810 includes five items that (for this example) resulted from searching the catalog of items 150 for "Front Street" in "Memphis." These items include a certificate for entry to the Rock 'N Soul Museum (tourism item), a gift certificate for Chez Philippe (restaurant item), tickets for the Memphis Queen Line (tourism item), as well as the book items "The Firm" and "Dixie: A Personal Odyssey Through Events That Shaped the Modern South." In the map 810, indicators representing these items are depicted on or near Front Street in downtown Memphis. Again, as with the map 610 shown in FIG. 6, and map 710 shown in FIG. 7, the map 810 shown in FIG. 8 includes controls 612, 614, and 616 that can be used to modify an attribute of the map, such as the scale of geographic area shown in the map, or the geographic attribute providing the focus of the map. Clicking or otherwise selecting one of the item indicators may enable the user to obtain the selected item in a commercial transaction, e.g., by placing the item in an electronic shopping cart for the user.

Embodiments of the present invention may further be configured to identify geographically related items to a user as a result of a commercial transaction involving an item having a geographic attribute. For instance, a commercial transaction for the book item "The Firm" may produce an order summary Web page 910 as depicted in the Web browser 900 of FIG. 9. Titled "Shopping Order Summary" 920, the Web page 910 include details 922 on the book, the shipping charges, and tax, as is customary to report to a user in an electronic commerce transaction. If the user initiates a first button 924 as shown, the commercial transaction continues toward checkout and purchase of the item 922. If the user initiates a second button 926 as shown, the user returns to shopping in the catalog of items 150. The item 922 may remain in the user's shopping cart.

The Web page 910 further provides the user with an option 930 to consider other items related to the item 922 by geography. Here, as with FIG. 5, the book item 922 has been analyzed and geographic attributes have been associated with the book. Where the book item 922 is "The Firm" in this example, the Web page 910 lists geographic attributes including: Memphis (TN) 932, Cayman Islands 934, Chicago (IL) 936, Boston (MA) 938, Washington D.C. 940, Panama City (FL) 942, and more 944, configured as hypertext links. If a user clicks on the Memphis (TN) link 932, the user may be provided with a map of Memphis, with items geographically related to Memphis, as illustrated in FIG. 7. Clicking on the Cayman Islands link 934 could similarly result in a map depicting the Cayman Islands, with items that share a "Cayman Islands" geographic attribute being shown on the map on or near the islands.

Additional embodiments of the invention may be configured to display geographic attributes of one or more items available for commercial transaction. After identifying an item and analyzing data associated with the item to identify one or more geographic attributes of the item, a map may be provided on which one or more indicators are displayed based on the identified geographic attributes of the item. Processes for analyzing data associated with an item may include analyzing content of the item and identifying one or more geographic attributes in the content. In other circumstances, analyzing data associated with an item may include analyzing a data structure in which one or more previously identified geographic attributes of the item are stored.

Figure 10:
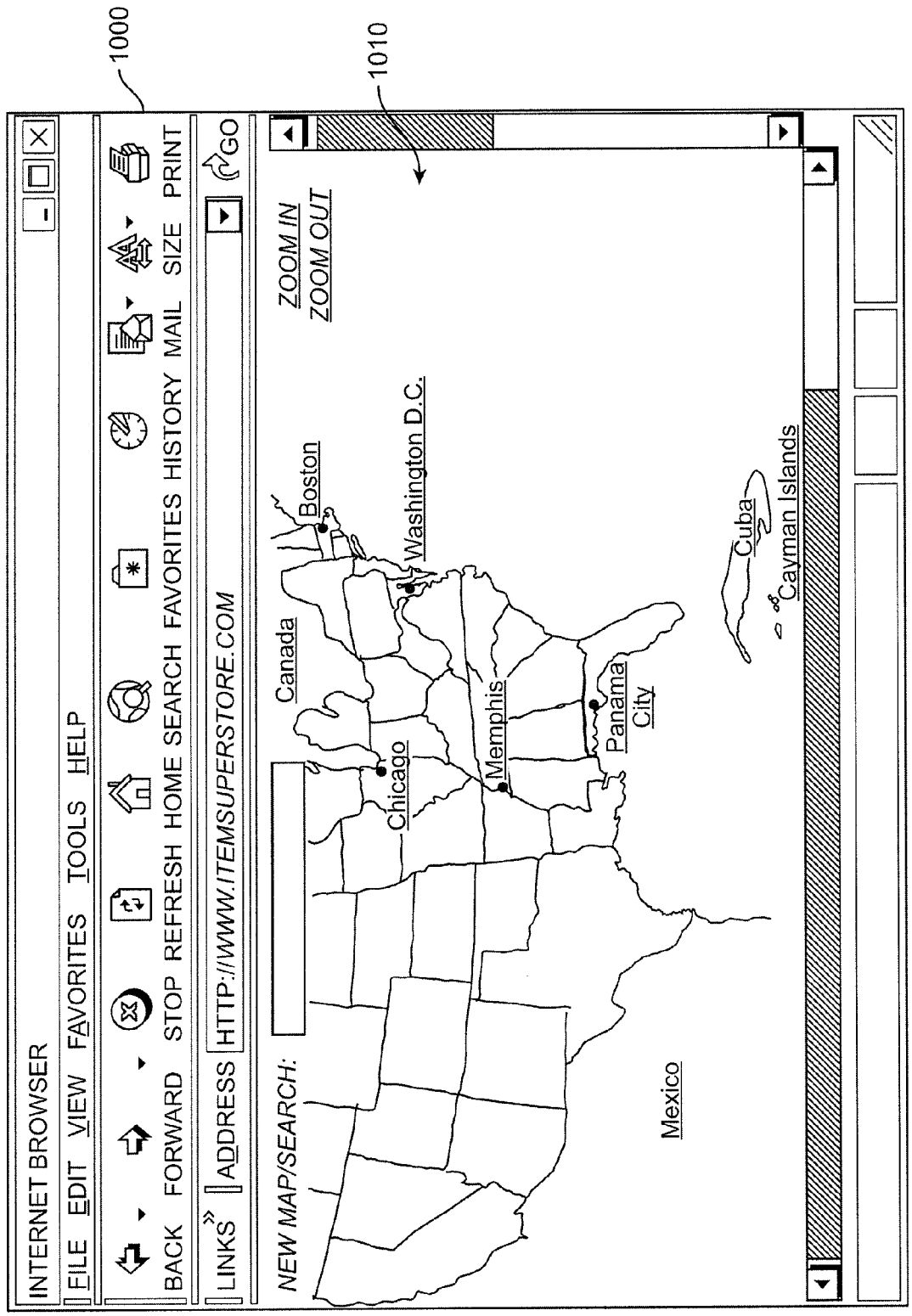
FIG. 10 illustrates a Web browser with a Web page showing a map on which geographic attributes of an item are displayed.

For example, as discussed earlier, analysis of the book "The Firm" may identify and associate geographic attributes such as Memphis (TN), Cayman Islands, Chicago (IL), Boston (MA), Washington D.C., and Panama City (FL) with the book. These geographic attributes may be stored in a data structure 400 as shown in FIG. 4. Turning now to FIG. 10, a Web browser 1000 is shown depicting a map 1010 on which indicators are displayed based on the foregoing geographic attributes of the book "The Firm". Specifically, indicators in the form of text links are shown geographically to depict Memphis, Cayman Islands, Chicago, Boston, Washington D.C., and Panama City.

For context, other indicators such as adjacent country names (here, Mexico, Canada, and Cuba) may also be shown, possibly in a different color, font, or size, to distinguish from geographic attributes associated with the book (or other item) at issue. In another example, a map with indicators may be displayed showing of all the places referenced in Jack Kerouac's work "On the Road."

Place names are not the only features of an item for which geographic attributes can be identified and associated with the item. For example, Billy Joel's song "We Didn't Start the Fire" refers to a number of people (including Kerouac), places (e.g., Dien Bien Phu and Little Rock), events (e.g., "Liston beats Patterson" and Woodstock), and items (e.g., "The King and I" and "Catcher in the Rye"). Analysis of the content of the song identifying, for example, "Liston beats Patterson", may result in identifying Comiskey Park, Chicago (IL), where the framed Sep. 26, 1962 boxing match was fought. The geographic attributes "Comiskey Park" and "Chicago" may be associated with the Billy Joel song, even though the actual place names are not explicitly referenced in the lyrics. Genres of items, such as music, having known geographic origin may also have that origin associated with the item as a geographic attribute (e.g., "Seattle" associated with a grunge music item, "Nashville" associated with certain country music items, etc).

An item may be identified for analysis and display on map 1010 based on direct user input or automatically based on other factors, including user activity. For example, the map 810 shown in FIG. 8 depicts Memphis with various indicators of items, including the book item "The Firm". User interaction with the map 810, e.g., clicking on or otherwise selecting the indicator for "The Firm", may result in identifying the item and generating the map 1010. In similar fashion, selection of an indicator on the map 1010, e.g., clicking on the indicator for Memphis, may result in generating the map 810. In such cases, selection of an indicator is used to modify a geographic area shown by the map. The geographic area of the map may be modified to focus on a smaller scale geographic area in relation to the selected indicator.

Selection of an indicator may further enable a user to obtain an item in a commercial transaction. For example, clicking on or otherwise selecting the indicator for "The Firm" on the map 810 may ultimately lead to the checkout Web page 910 shown in FIG. 9.

The map 1010 in FIG. 10 may also be configured to depict geographic attributes of multiple items. For example, in addition to displaying geographic attributes of "The Firm", a user may identify another John Grisham novel and have the geographic attributes of the additional novel shown on the map, possibly in a different color, font, or size to distinguish between the items. In yet other circumstances, the additional item shown on the map 1010 (e.g., another John Grisham novel) may be selected based on its sharing a geographic attribute with the initially identified item (here, "The Firm"). For example, "The Pelican Brief" by John Grisham also references Washington D.C. which is referenced in "The Firm". One or more additional indicators may be displayed on the map 1010 based on geographic attributes of the additional item. As with other embodiments described above, geographic attributes of the items may be organized in a hierarchy, wherein one or more indicators are displayed on the map based on the level of the geographic attributes in the hierarchy.

While several embodiments of the invention have been illustrated and described herein, it will be appreciated that various changes can be made to these embodiments without departing from the spirit and scope of the invention. For example, while FIG. 1 illustrates a distributed computing environment, the invention may be employed locally on a computing system that is not connected to a network. In this alternative embodiment, providing access to the catalog of items 150 may be accomplished by providing the catalog of items to the user for local access and searching. A local repository may be used to hold the catalog of items, wherein the processing component of the system is configured to locally search the catalog.

Embodiments of the invention may further comprise a computer accessible medium having a searchable database stored thereon. Where desired, the database may be configured to support commercial transactions of items. The database may include one or more data structures prepared by analyzing items to identify geographic attributes of the items, associating the identified geographic attributes with their respective items, and providing (i.e., generating or updating) one or more data structures for the items. The identified geographic attributes are placed in fields of the data structures that are searchable using a geographic attribute. Geographically related items identified by the search can be depicted on a map for a user to consider for a commercial transaction.

What is claimed is:

1. A computer-implemented method of displaying items that are available for commercial transaction, the method comprising:
   under control of one or more computer systems configured with executable instructions,
   analyzing data associated with items for consumption to identify any geographic locations associated with each of the items;
   associating geographic attributes with the items for consumption corresponding to the identified geographic locations;
   receiving an indication of a particular geographic location from a user;
   identifying, based at least in part on the particular geographic location, one or more of the items for display;
   providing for display a geographic representation of the particular location on which information representative of an identified item of said items is positioned and displayed based on at least one of the geographic locations for the identified item; and
   offering for consumption the identified item from a merchant, said merchant being independent of the particular geographic location.

2. The method of claim 1, wherein analyzing data associated with items includes analyzing a description of an item and identifying a geographic attribute in the description.

3. The method of claim 2, wherein the description originates with a maker of the item.

4. The method of claim 2, wherein the description originates with a party to a commercial transaction for the item.

5. The method of claim 2, wherein the description originates with a third party to a commercial transaction for the item.

6. The method of claim 1, wherein analyzing data associated with items includes analyzing content of the items and identifying a geographic attribute in the content.

7. The method of claim 6, wherein the item includes textual content and the geographic attribute is identified in the textual content.

8. The method of claim 6, wherein the item includes audio content and the geographic attribute is identified in the audio content.

9. The method of claim 6, wherein the item includes visual content and the geographic attribute is identified in the visual content.

10. The method of claim 1, wherein associating the identified geographic attributes with the items includes storing the identified geographic attributes in a searchable field of a data structure for the items.

11. The method of claim 10, further comprising providing a network site at which the data structure can be searched using a geographic attribute.

12. The method of claim 11, wherein the network site is accessible via a global computer network.

13. The method of claim 10, further comprising providing the data structure to a user for local access and searching by the user.

14. The method of claim 1, wherein the geographic representation includes an image of a map, wherein said items for consumption include a plurality of consumer products, and further comprising:
   receiving information indicating user interaction with the map; and
   identifying one or more of said consumer products for display on the map using a geographic attribute derived from the user interaction with the map.

15. The method of claim 14, wherein the map is provided with a modifiable map attribute.

16. The method of claim 15, wherein a user can directly modify the map attribute.

17. The method of claim 15, wherein the map attribute is modifiable based on user interaction with at least one of the consumer products.

18. The method of claim 15, wherein modification of the map attribute modifies a geographic attribute used to identify the one or more consumer products for display.

19. The method of claim 15, wherein modification of the map attribute modifies a geographic area shown by the map.

20. The method of claim 1, further comprising providing a geographic attribute index to facilitate identification of one or more items for display.

21. The method of claim 1, wherein an identified item is displayed on or near a geographic element in the geographic representation based on a geographic attribute of the identified item.

22. The method of claim 1, wherein one or more items are identified for display as a result of a criterion specifying a geographic attribute derived from an item that was previously identified for display.

23. The method of claim 1, wherein one or more items are identified for display as a result of a criterion specifying a geographic attribute received from a user in a search query.

24. The method of claim 1, wherein one or more items are identified for display as a result of a commercial transaction involving another item having a geographic attribute.

25. The method of claim 1, wherein a geographic attribute indicates a particular geographic location.

26. The method of claim 1, wherein a geographic attribute indicates a natural geographic feature.

27. The method of claim 1, wherein a geographic attribute indicates a geographic area.

28. The method of claim 1, further comprising identifying items as geographically related if they share one or more geographic attributes.

29. The method of claim 1, further comprising enabling a user viewing the map to obtain a displayed item in a commercial transaction.

30. A computing system, comprising:
an interface configured to receive a criterion specifying a geographic attribute;
a processing component in communication with the interface, the processing component being configured to analyze information for plurality of items available for commercial transaction, each of the plurality of items being associated with at least one geographic location, the processing component being further configured to identify one or more of the plurality of items based on the geographic attribute specified by the criterion and the geographic locations for the identified items and to provide an offer to consume at least one of said items from a merchant, said merchant being independent from an associated geographic location that is associated with said at least one of said items; and
a display component configured to provide a display on which information representative of the one or more identified items are shown based on the geographic attribute.

31. The computing system of claim 30, wherein the catalog of items is contained in one or more repositories that are remote from the computing system, and wherein the processing component is further configured to communicate with the remote repositories for searching the catalog of items.

32. The computing system of claim 30, further comprising a local repository that contains the catalog of items, wherein the processing component is configured in communication with the repository for searching the catalog of items.

33. The computing system of claim 30, wherein the catalog of items contains a data structure for an item available for commercial transaction that includes a searchable field holding a geographic attribute of the item.

34. The computing system of claim 30, wherein the display component provides a map on the display, and wherein the one or more items identified by the search are shown on the map by an indicator representing each of said one or more items identified by the search.

35. The computing system of claim 30, wherein the display component provides a map on the display, and wherein the map includes a modifiable map attribute.

36. The computing system of claim 35, wherein the display component enables a user to directly modify the map attribute.

37. The computing system of claim 35, wherein the map attribute is modifiable based on user interaction with at least one of the items.

38. The computing system of claim 35, wherein modification of the map attribute modifies a geographic attribute on which a search of the items consumer products in the catalog is conducted.

39. The computing system of claim 35, wherein modification of the map attribute changes the geographic area shown by the map.

40. The computing system of claim 39, wherein the map attribute is modifiable to define a geographic area on a scale that is larger than a map currently provided by the display component.

41. The computing system of claim 39, wherein the map attribute is modifiable to define a geographic area on a scale that is smaller than a map currently provided by the display component.

42. The computing system of claim 30, wherein the display component is configured to provide a map showing the one or more identified items on or near a geographic element in the map based on a geographic attribute of the identified items.

43. The computing system of claim 30, further comprising a transaction engine that enables a user to conduct a commercial transaction to obtain an item shown on the display.

* * * * *

UNITED STATES PATENT AND TRADEMARK OFFICE
CERTIFICATE OF CORRECTION

| | | |
|---|---|---|
| PATENT NO. | : 7,788,134 B1 | Page 1 of 1 |
| APPLICATION NO. | : 11/090326 | |
| DATED | : August 31, 2010 | |
| INVENTOR(S) | : Manber et al. | |

It is certified that error appears in the above-identified patent and that said Letters Patent is hereby corrected as shown below:

In the Claims

Column 18, line 23, please delete "consumer products in the catalogue"

Signed and Sealed this
Twenty-eighth Day of June, 2011

David J. Kappos
*Director of the United States Patent and Trademark Office*